US012693380B2

(12) United States Patent
Lee et al.

(10) Patent No.: US 12,693,380 B2
(45) Date of Patent: Jul. 28, 2026

(54) PHASE ERROR COMPENSATION DEVICE AND METHOD OF RADAR, AND RADAR DEVICE INCLUDING THE SAME

(71) Applicant: HL Klemove Corp., Incheon (KR)

(72) Inventors: Jingu Lee, Incheon (KR); Jung Hwan Choi, Incheon (KR)

(73) Assignee: HL Klemove Corp, Incheon (KR)

( * ) Notice: Subject to any disclaimer, the term of this patent is extended or adjusted under 35 U.S.C. 154(b) by 312 days.

(21) Appl. No.: 18/412,660

(22) Filed: Jan. 15, 2024

(65) Prior Publication Data

US 2024/0319334 A1    Sep. 26, 2024

(30) Foreign Application Priority Data

Mar. 23, 2023    (KR) .......................... 10-2023-0038030

(51) Int. Cl.
G01S 7/40 (2006.01)

(52) U.S. Cl.
CPC .......... G01S 7/4091 (2021.05); G01S 7/4021 (2013.01); G01S 7/403 (2021.05)

(58) Field of Classification Search
CPC ...... G01S 7/4091; G01S 7/403; G01S 7/4021; G01S 13/42; G01S 7/40; G01S 13/003; G01S 13/02; G01S 13/343; G01S 13/536; G01S 13/584; G01S 13/931
See application file for complete search history.

(56) References Cited

U.S. PATENT DOCUMENTS

| | | | |
|---|---|---|---|
| 2021/0270961 A1* | 9/2021 | You | ........................ G01S 7/4008 |
| 2022/0268924 A1 | 8/2022 | Choi et al. | |
| 2023/0003518 A1 | 1/2023 | Lee et al. | |

FOREIGN PATENT DOCUMENTS

| | | | | |
|---|---|---|---|---|
| JP | 7117064 B2 | 8/2022 | | |
| KR | 10-2012-0100039 A | 9/2012 | | |
| KR | 102042147 B1 * | 11/2019 | .......... | G01S 13/726 |
| KR | 10-2020-0010816 A | 1/2020 | | |
| KR | 10-2021-0109855 A | 9/2021 | | |
| KR | 2021-0152911 A | 12/2021 | | |
| KR | 10-2022-0118619 A | 8/2022 | | |

(Continued)

OTHER PUBLICATIONS

KR_102042147_B1_I_translate.pdf (Year: 2019).*

(Continued)

*Primary Examiner* — Yonghong Li
(74) *Attorney, Agent, or Firm* — Harvest IP Law, LLP

(57) ABSTRACT

The present embodiments relate to a phase error compensation device and method of a radar and a radar device including the same. A phase error compensation device according to an embodiment may include a first determiner configured to determine, for each first distance to a moving target, a first phase error between a phase of a first reception signal corresponding to a first transmission signal transmitted from a first transmission antenna and a phase of a second reception signal corresponding to a second transmission signal from a second transmission antenna, and a lookup table generator configured to generate and store a lookup table for phase compensation including phase compensation values for each distance based on the first phase error for each first distance.

23 Claims, 17 Drawing Sheets

(56)　　　　　　References Cited

FOREIGN PATENT DOCUMENTS

| KR | 10-2023-0007142 | A | 1/2023 | |
| WO | WO-2012117080 | A1 * | 9/2012 | .............. G01S 3/48 |

OTHER PUBLICATIONS

WO_2012117080_A1_I_translate.pdf (Year: 2012).*
J. Bechter, F. Roos and C. Waldschmidt, "Compensation of Motion-Induced Phase Errors in TDM MIMO Radars," in IEEE Microwave and Wireless Components Letters, vol. 27, No. 12, pp. 1164-1166, Dec. 2017, doi: 10.1109/LMWC.2017.2751301 (Year: 2017).*
Huazeng Deng et al. Phase Calibration of an Along-Track Interferometric FMCW SAR.
2nd Office Action issued in Korean Patent Application No. 10-2023-0038030 dated Nov. 11, 2025.
Office Actio n issued in Korean Patent Application No. 10 2023 0038030 dated Feb. 27, 2025.
Office Action issued from Korean Patent Office, dated Feb. 27, 2025.

* cited by examiner

PHASE ERROR COMPENSATION DEVICE AND METHOD OF RADAR, AND RADAR DEVICE INCLUDING THE SAME

CROSS REFERENCE TO RELATED APPLICATION

This application claims priority from Korean Patent Application No. 10-2023-0038030, filed on Mar. 23, 2023, the entire contents of which is hereby incorporated by reference for all purposes as if fully set forth herein.

TECHNICAL FIELD

Embodiments of the present disclosure relate to a phase error compensation device and method of a radar and a radar device including the same, more particularly, to a device and method for phase error compensation up to a far-field distance in a radar device including a multi-input multi-output (MIMO) antenna.

BACKGROUND

Recently, there is widely developed and used a driver assistance system (DAS), and it is required to be acquired accurate target information for the DAS.

A plurality of vehicle sensors may be used to implement such a DAS function, and a vehicle radar device is one of the plurality of vehicle sensors.

Meanwhile, a camera sensor, among vehicle sensors, has an advantage of being able to obtain accurate target information, but has a disadvantage in that the use of the camera is limited depending on a climatic environment such as nighttime or fog.

However, a vehicle radar sensor is widely used as a vehicle sensor in that there is relatively no limitation due to nighttime or weather conditions.

A radar device mounted in a vehicle may transmit a radar signal, which is an electromagnetic wave having a specific frequency, receive a signal reflected from an object, and then processes the reception signal to acquire the location or speed information of the object.

The vehicle radar may include one or more transmission antennas and one or more receiving antennas, and may obtain target information such as the lateral direction information (i.e., azimuth) and distance of the target from a synthesized signal of the transmission signal and the reception signal reflected from the target.

In addition, vehicle radar may be one of a single-input multi-output (SIMO) type radar device using a single transmission antenna, and a multi-input multi-output (MIMO) type radar device using two or more transmission antennas.

Meanwhile, in order to accurately estimate the angle of a target in a radar, it is necessary to assume that the signals transmitted and received from the radar are plane waves.

However, the plane wave condition of the radar signal is satisfied only at points that are more than a far-field distance away from the radar transmitter. At distances closer than this far-field distance, phase errors may occur due to various factors in the radar device. Therefore, there is required to accurately measure and compensate the phase error in order to obtain accurate target information.

An anechoic chamber may be used to measure phase error up to the far-field distance.

That is, after placing the radar device in an anechoic chamber and placing a target at a specific location, the phase of the reception signal reflected from a target for each transmission antenna may be measured to calculate the phase error for each target distance.

Meanwhile, the far-field distance is proportional to the square of a size D of the transmission antenna size, and therefore, a far-field distance of MIMO radar with a larger transmission antenna size may be greater than the far-field distance of the SIMO radar.

As the far-field distance increases, there is required to increase the size of the anechoic chamber for measuring the phase error according to the distance to the far-field distance.

Since a vehicle radar uses radar signals in the tens of GHz frequency band, a very large anechoic chamber is required to accurately measure the phase error of a MIMO radar device.

However, since there is a limit to the size of the anechoic chamber, there may be a problem that it is difficult to accurately measure the phase error up to the far-field distance of the MIMO radar.

Accordingly, the present disclosure discloses an device and method for accurately measuring the phase error up to the far-field distance of the MIMO radar.

SUMMARY

An object of the present disclosure is to provide a device and method for accurately measuring the phase error up to the far-field distance of the MIMO radar.

Another object of the present disclosure is to provide a radar device capable of measuring and storing the phase error for each distance of a fixed (i.e., stationary) target and/or a moving target and performing phase compensation for target information.

In accordance with an aspect of the present disclosure, there may be provided a phase error compensation device of a radar including a first and a second transmission antennas and a plurality of reception antennas. The phase error compensation device may include a first determiner configured to determine, for each first distance to a moving target, a first phase error between a phase of a first reception signal and a phase of a second reception signal, wherein the first and second reception signals are received by the plurality of reception antennas, and the first reception signal corresponds to a first transmission signal transmitted from the first transmission antenna and the second reception signal corresponds to a second transmission signal transmitted from the second transmission antenna, and a lookup table generator configured to generate and store, based on the first phase error for each first distance, a lookup table for phase compensation including phase compensation values corresponding to each distance.

In addition, the phase error compensation device may further include a second determiner configured to determine, for each second distance to a fixed (i.e., stationary) reference target, a second phase error between a phase of a first reference reception signal and a phase of a second reference reception signal, wherein the first reference reception signal corresponds to a first reference transmission signal transmitted from the first transmission antenna and the second reference reception signal corresponds to a second reference transmission signal transmitted from the second transmission antenna, wherein the lookup table generator configured to generate the lookup table for phase error based on the second phase error for each second distance.

In this case, the first determiner may determine the first phase error using only the first reception signal and/or the second reception signal whose phase linearity is greater than a predetermined threshold.

In addition, the phase error compensation device may further include a storage unit for storing the first phase error for each first distance and the second phase error for each second distance.

The first determiner may determine the first phase error for each first distance up to a far-field distance of the radar.

In addition, the first determiner may determine an average value of the first phase errors for each distance as the first phase error for each first distance.

Alternatively, the first determiner may perform a curve fitting in a range-phase error graph on data collected for each first distance, and determines the first phase error for each first distance based on a fitting line.

In this case, the fitting line in the range-phase error graph may have a minimum absolute phase error value at a single-input multi-output (SIMO) based far-field distance ($d_{far\_SIMO}$) for the first transmission antenna or the second transmission antenna.

Accordingly, the first determiner may determine the first phase error for each first distance up to the far-field distance of the radar of a multi-input multi-output (MIMO) type based on a single-input multi-output (SIMO) calibration distance corresponding the SIMO-based far-field distance ($d_{far\_SIMO}$) for the first transmission antenna or the second transmission antenna.

In addition, the fitting line in the range-phase error graph may have a saturated phase error value at a distance greater than the far-field distance of the radar of a MIMO type.

In accordance with another aspect of the present disclosure, there may be provided a phase error compensation method of a radar including a first and a second transmission antennas and a plurality of reception antennas. The method includes determining a moving target by receiving a reception signal from each of the plurality of receiving antennas, determining, for each first distance to the moving target, a first phase error between a phase of a first reception signal and a phase of a second reception signal, wherein the first and second reception signals are received by the plurality of reception antennas, and the first reception signal corresponds to a first transmission signal transmitted from the first transmission antenna and the second reception signal corresponding to a second transmission signal transmitted from the second transmission antenna, and generating and storing, based on the first phase error for each first distance, a lookup table for phase compensation including phase compensation values for each distance.

In accordance with another aspect of the present disclosure, there may be provided a radar device including an antenna unit including a transmission antenna unit with a first transmission antenna and a second transmission antenna and a receiving antenna unit with a plurality of receiving antennas, a transceiver configured to control to transmit a transmission signal through the transmission antenna unit and receive a reception signal through the receiving antenna unit, a phase error compensation device configured to determine, for each first distance to a moving target, a first phase error between a phase of a first reception signal and a phase of a second reception signal, wherein the first reception signal corresponds to a first transmission signal transmitted from the first transmission antenna and the second reception signal corresponds to a second transmission signal transmitted from the second transmission antenna, and wherein the phase error compensation device is further configured to generate and store, based on the first phase error for each first distance, a lookup table for phase compensation including phase compensation values corresponding to each distance, and a signal processor configured to acquire target information by compensating a phase of a target reception signal based on the phase compensation values for each distance stored in the lookup table.

As will be described below, according to an embodiment of the present disclosure, it is possible to provide a device and method for accurately measuring the phase error up to the far-field distance of the MIMO radar.

In addition, according to an embodiment of the present disclosure, it is possible to provide a radar device capable of measuring and storing the phase error for each distance of a fixed (i.e., stationary) target and/or a moving target, and performing phase compensation for the target information, thereby accurately estimating the azimuth and elevation angle information of the target.

DETAILED DESCRIPTION

Figure 1:
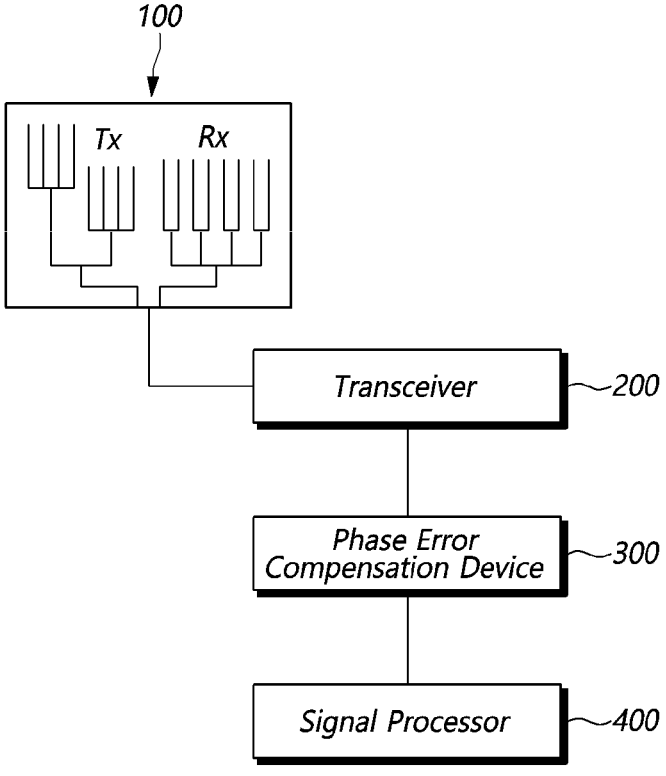
FIG. 1 illustrates an example of a schematic configuration of a radar device according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, it will be described the embodiments in detail with reference to the drawings.

FIG. 1 illustrates an example of a schematic configuration of a radar device according to an embodiment of the present disclosure.

A radar device according to an embodiment may include an antenna unit 100, a transceiver 200, a phase error compensation device 300, and a signal processor 400.

The antenna unit 100 may include a transmission antenna unit including a first transmission antenna Tx1 and a second transmission antenna Tx2, and a receiving antenna unit including a plurality of receiving antennas.

A specific configuration of the antenna unit 100 will be described in more detail below with reference to FIGS. 3 and 4.

The transceiver 200 may transmit a transmission signal through the transmission antenna unit and receive a reception signal through the receiving antenna unit.

The transceiver 200 of the radar device according to the present embodiment may include a transmitter and a receiver. The transmitter may include an oscillation part which generates a transmission signal by supplying a signal to each transmission antenna. Such an oscillation part may include, for example, a voltage-controlled oscillator (VCO), an oscillator, and the like.

The receiver included in the transceiver 200 may include a low noise amplifier (LNA) which low-noise-amplifies a reflected signal received through the receiving antenna, a mixer which mixes the low-noise-amplified reception signal, an amplifier which amplifies the mixed reception signal, and a converter (analog-to-digital converter (ADC)) which digitally converts the amplified reception signal to generate reception data.

As described above, the radar device according to the present embodiment may be a MIMO radar device that transmits a plurality of transmission signals simultaneously or in time division through multiple transmission antennas and receives the reception signals through multiple receiving antennas.

Meanwhile, an antenna phase of the radar device may be distorted due to differences in the length of transmission lines within the radar device, process errors, etc. Therefore, there is a need to correct the phase around a specific reference point.

Also, accurate estimation of the angle of a target in a radar device requires the assumption that the signals transmitted and received from the radar are plane waves.

However, the conditions of the plane wave for the radar signal is satisfied only at points located beyond a far-field distance from the radar transmitter. At distances closer than this far-field distance, phase errors may occur in the radar device due to various factors. Therefore, it is necessary to accurately measure and compensate for the phase errors to obtain precise target information.

Typically, an anechoic chamber may be used to measure phase errors up to the far-field distance.

Meanwhile, the far-field distance of the radar device is proportional to the square of the transmission antenna size D. Therefore, the far-field distance of the MIMO radar increases compared to the SIMO radar when the MIMO radar is equipped with a larger transmission antenna size.

In more detail, the far-field distance $d_{far\_SIMO}$ of the SIMO radar may be defined by Equation 1 below.

$$d_{far\_SIMO} \geq \frac{2D^2}{\lambda} \qquad \text{[Equation 1]}$$

Here, $d_{far\_SIMO}$ is the far-field distance of the SIMO radar, which is a Fraunhofer distance of the SIMO radar, and D is the size (i.e., diameter) of the radar device. A is the wavelength of the transmission signal.

On the other hand, in the case of a MIMO radar device including multiple transmission antennas, the far-field distance, at which the phase error becomes constant or saturates, may be longer than that of the SIMO radar. Specifically, the far-field distance $d_{far\_MIMO}$ of the MIMO radar having two transmission antennas may be defined by Equation 2 below.

$$d_{far\_MIMO} \geq \frac{2(2D)^2}{\lambda} \qquad \text{[Equation 2]}$$

That is, considering the 2-way transmission and reception model in the case of MIMO radar, the far-field distance may be more than 4 times that of SIMO radar.

With the increase in the far-field distance, there is a need to expand the size of the anechoic chamber used to measure the phase error, which is dependent on the distance to the far-field distance.

However, in practice, there is a constraint on the size of the anechoic chamber, posing a challenge in accurately measuring the phase error up to the far-field distance of the MIMO radar.

To solve this problem, calibration may be performed by measuring phase errors at the far-field distance of the SIMO radar, and phase correction may be implemented using the measured phase errors.

However, in this case, there may be a phase error between the transmission antennas included in the MIMO radar device, and this phase error may persist until the far-field distance condition of the MIMO radar device is satisfied.

This phase error may vary depending on the distance, becoming smaller as the distance increases.

Due to this phase error, there may occur errors in an azimuth angle information and elevation angle information of a target obtained from the MIMO radar device. Consequently, there may be an obstacle to obtaining precise target information.

Accordingly, an embodiment of the present disclosure may propose a device and method for accurately measuring the phase error up to the far-field distance of the MIMO radar.

Specifically, a phase error compensation device 300 according to the present embodiment may determine, for each first distance to a moving target selected among the plurality of moving objects, a first phase error between a phase of a first reception signal corresponding to a first transmission signal transmitted from the first transmission antenna and a phase of a second reception signal corresponding to a second transmission signal from the second transmission antenna, and may generate a lookup table for phase compensation based on the first phase error for each first distance.

According to an embodiment, such determination of a first phase error may be performed for a first distance to another moving target selected among the plurality of moving objects. By doing so, determination of a first phase error may be performed for each first distance to various moving targets selected from among the plurality of moving targets, ultimately resulting in obtaining multiple first phase errors, each corresponding to a different distance.

According to an embodiment, such determination of a first phase error may be performed repeatedly for a different first distance to the same moving target selected among the plurality of moving objects while the moving garget moves to different distances. By doing so, determination of different first phase errors for different distances may be performed, ultimately resulting in obtaining multiple first phase errors, each corresponding to a different distance.

Figure 2:
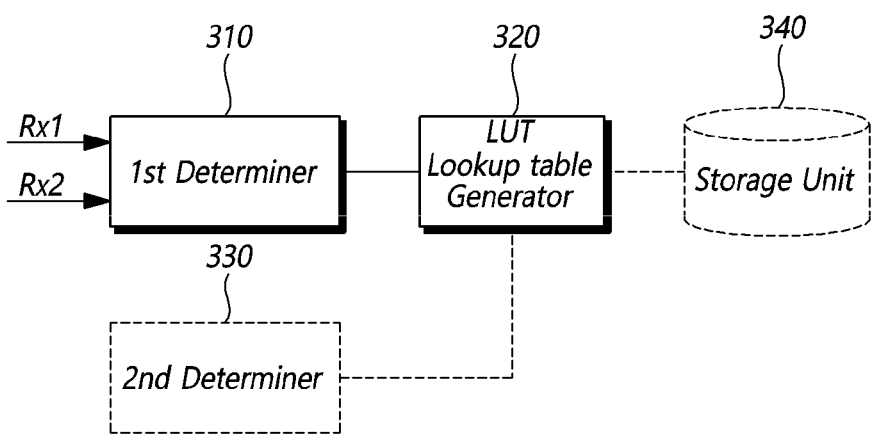
FIG. 2 illustrates a configuration of a phase error compensation device according to an embodiment of the present disclosure.

FIG. 2 illustrates a configuration of a phase error compensation device 300 according to an embodiment of the present disclosure.

The phase error compensation device 300 according to an embodiment of the present disclosure may include a first determiner 310 and a lookup table generator 320.

In addition, the phase error compensation device 300 may further include a second determiner 330 and a storage unit 340.

The first determiner 310 of the phase error compensation device 300 may determine, for each first distance to a moving target selected among the plurality of moving objects, a first phase error between a phase of a first reception signal corresponding to a first transmission signal transmitted from the first transmission antenna and a phase of a second reception signal corresponding to a second transmission signal from the second transmission antenna.

According to an embodiment, in determining the first phase error, the first determiner 310 may use the first reception signal or the second reception signal only when they have phase linearity greater than or equal to the specific threshold. That is, while multiple reception signals are received, only reception signals having the phase linearity greater than or equal to the specific threshold to determine the first phase error.

According to an embodiment, the first determiner 310 may determine the first phase error for each first distance up to the far-field distance of the radar.

Specifically, according to an embodiment, i) the first determiner 310 may determine an average of the first phase errors for each first distance as the first phase error for each first distance. On the other hand, according to an embodiment, ii) the first determiner 310 may perform a curve fitting in a range-phase error graph on data collected for each first distance and determine the first phase error for each first distance based on a fitting line.

In this case, the fitting line in the range-phase error graph may have the minimum absolute phase error value at the SIMO-based far-field distance $d_{far\_SIMO}$ for the first or second transmission antenna.

Therefore, the first determiner 310 may determine a first phase error for each first distance up to the far-field distance of the MIMO radar based on a SIMO-based far-field distance $d_{far\_SIMO}$ or a SIMO calibration distance $d_{cal}$, which is the distance that has the minimum absolute value of phase error.

In addition, the fitting line in the range-phase error graph may have a saturated phase error value $\phi_{r,err,sat}$ at a distance greater than the far-field distance of the MIMO radar.

Meanwhile, the lookup table generator 320 of the phase error compensation device 300 may generate and store a lookup table LUT for phase error compensation. This table includes phase compensation values corresponding to each distance, based on the first phase error estimated for each first distance by the first determiner 310. For example, the lookup table LUT may include a phase error corresponding to distance X1 and a phase error corresponding to distance X2. The lookup table LUT may include the phase errors corresponding to distances up to the far-field distance of the MIMO radar.

In addition, a second determiner 320 of the phase error compensation device 300 may determine, for each second distance to a fixed (i.e., stationary) reference target, a second phase error between a phase of a first reception signal and a phase of a second reception signal. The first reception signal corresponds to a first transmission signal transmitted by a first transmission antenna and reflected from the fixed (i.e., stationary) reference target, and the second reception signal corresponds to a second transmission signal transmitted by a second transmission antenna and reflected from the fixed (i.e., stationary) reference target. According to an embodiment, the second determiner 320 may determine a second phase error for a distance Y1 where a fixed (i.e., stationary) reference target is located and a second phase error for a distance Y2 where another fixed (i.e., stationary) reference target is located.

The storage unit 340 of the phase error compensation device 300 may store the first phase error for each first distance and the second phase error for each second distance. Additionally, the storage unit 340 may additionally store the generated lookup table LUT for the phase error compensation.

The lookup table LUT for phase error compensation generated by the lookup table generator 320 may be a table-type data set in which phase error values $\phi_{r,err}$ or corresponding phase compensation values are matched to distance values or distance sections from the MIMO radar device.

The specific operation method of the first determiner 310 and the lookup table generator 320 will be described in more detail below with reference to FIGS. 5 to 10.

Meanwhile, the signal processor 400 of the radar device according to the embodiment shown in FIG. 1 may accurately acquire target information by compensating for the phase based on the lookup table generated by the phase error compensation device. Since the lookup table includes the phase error values $\phi_{r,err}$ or corresponding phase compensation values corresponding to distance values up to the far-field distance, the signal processor 400 may accurately acquire target information using the lookup table even up to the far-field distance.

Specifically, the signal processor 400 of the radar device according to an embodiment may include a first processor and a second processor for signal processing. The first processor is a pre-processor for the second processor. The first processor may acquire transmission data and reception data, may control the oscillation part to generate a transmission signal based on the acquired transmission data, may synchronize the transmission data and the reception data, and may perform frequency conversion on the transmission data and the reception data.

The second processor may be a post-processor which performs actual processing using a processing result of the first processor. The second processor may perform operations such as a constant false alarm rate (CFAR) operation, a tracking operation, a target selection operation, and the like based on the reception data subjected to the frequency conversion by the first processor. In addition, the second processor may calculate azimuth information, which is horizontal direction information of the target, and elevation angle information, which is vertical direction information of the target.

The first processor may perform frequency conversion after data-buffering acquired transmission data and reception data in a unit sample size that is processable per cycle. The frequency conversion performed by the above-described first processor may be implemented using a Fourier transform such as a fast Fourier transform (FFT).

The second processor may perform a second Fourier transform on a signal subjected to the first Fourier transform (FFT) by the first processor. The second Fourier transform may be, for example, a discrete Fourier transform (DFT) (hereinafter, referred to as "DFT"). In addition, among DFTs, the second Fourier transform may be a chirp-discrete Fourier transform (chirp-DFT).

The second processor retrieves as many frequency values as a number corresponding to a second Fourier transform length K through the second Fourier transform such as a chirp-DFT. It determines a bit frequency having the greatest power for each chirp period based on the obtained frequency values. Then, it obtains velocity information and distance information of the target based on the determined bit frequency, thereby detecting the target.

The signal processor 400 may be referred to as a controller and may be implemented in a form of a digital signal processor (DSP).

Meanwhile, radar devices may be classified into pulse type, frequency modulation continuous wave (FMCW) type, frequency shift keying (FSK) type depending on the type of signal.

The FMCW radar device may utilize an up-chirp signal or a ramp signal, which is a signal whose frequency increases with time. It may calculate information on an object using a time difference between a transmission wave and a reception wave and a Doppler frequency shift.

In the following specification, the radar device according to an embodiment will be described as if it is a FMCW type radar device using a fast chirp signal, however the present disclosure is not limited thereto.

As shown in FIGS. 1 and 2, the MIMO radar device according to the present embodiment may estimate the phase error value for each distance up to the far-field distance and perform phase error compensation based on the estimated phase error values using the lookup table above-described, thereby improving the accuracy of target information estimation of the radar device.

Figure 3:
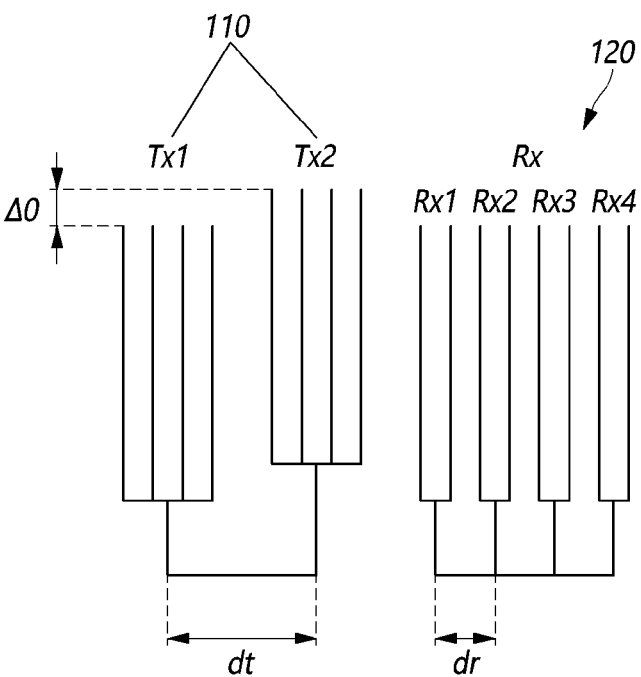
FIG. 3 illustrates an example of an antenna unit of a radar device according to an embodiment of the present disclosure.

FIG. 3 illustrates an example of an antenna unit of a radar device according to an embodiment of the present disclosure.

Referring to FIG. 3, the antenna unit 100 of the radar device capable of measuring an elevation angle of a target according to the present embodiment may include a transmission antenna unit 110 including Nt transmission antennas and a receiving antenna unit 120 including Nr receiving antennas. Nt and Nr are natural numbers equal to or larger than two (2).

In FIG. 3, a case where Nt is 2 and Nr is 4 will be described as an example.

According to the embodiment of FIG. 3, the antenna unit 100 may include two transmission antennas Tx1 and Tx2 and four receiving antennas Rx1, Rx2, Rx3 and Rx4. The two transmission antennas Tx1 and Tx2 may be positioned with a predetermined offset distance ΔO in a vertical direction, and a plurality of receiving antennas Rx1, Rx2, Rx3 and Rx4 may all have the same vertical position. In other words, the upper end of the transmission antenna Tx1 and the upper end of the transmission antenna Tx2 may be positioned at a predetermined distance of ΔO from each other in the vertical direction.

Figure 4A:
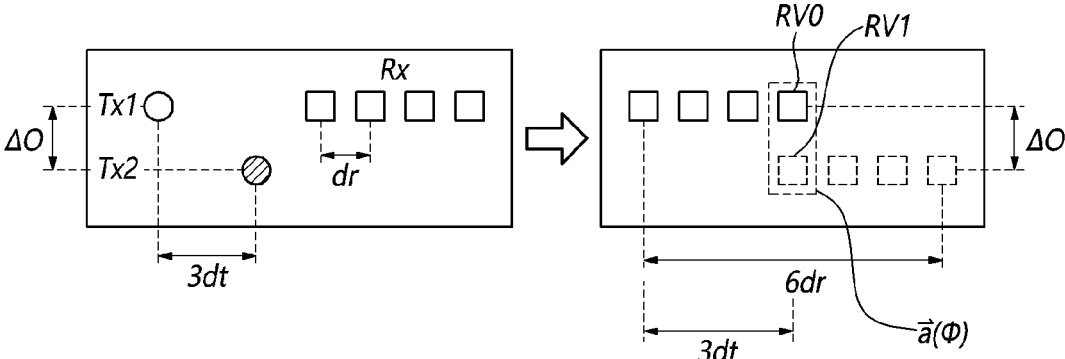
FIGS. 4A and 4B illustrate arrangement structures of a transmission antenna and a receiving antenna included in an antenna unit of a radar device according to an embodiment, and arrangement of a virtual receiving channel vector according to the arrangement structure.
Figure 4B:
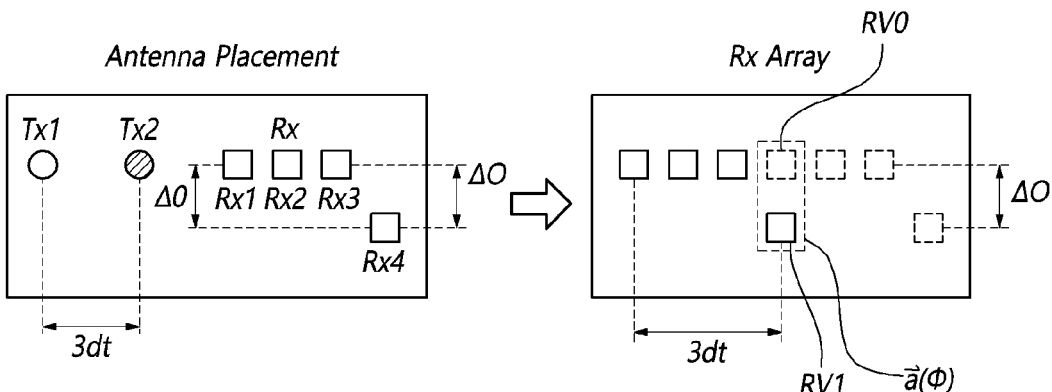

Alternatively, as shown in FIG. 4B, one of the receiving antennas may be offset in the vertical direction.

Each of the transmission antennas and the receiving antenna may have a structure in which two, four, or six array antennas share one feed point and extend to one side, but the present disclosure is not limited thereto.

Each array antenna forming the transmission antenna and the receiving antenna may include multiple elements or patches connected to an output line of a divider. Each array antenna may extend in an upper direction (upper direction of a vertical direction) from a starting point, such as a feed port connected to a chip that includes a controller or an input port of the divider.

In addition, the two transmission antennas Tx1 and Tx2, constituting the transmission antenna unit, may be spaced apart from each other by a horizontal distance dt in a horizontal direction perpendicular to an extending direction of each array antenna. In this case, the horizontal distance dt may be a distance 0.5λ, which is ½ of a wavelength of a transmission signal.

Meanwhile, four receiving antennas Rx1 to Rx4, constituting the receiving antenna unit, may also be disposed apart from each other by a horizontal distance dr in the horizontal direction.

According to an embodiment, the horizontal distances dt and dr may be set to the distance 0.5λ (i.e., ½ of the wavelength of the transmission signal), providing an effect in removing angle ambiguity caused by a grating lobe.

That is, if a distance between the receiving antennas in the horizontal direction is greater than the distance 0.5λ (½ of the wavelength of the transmission signal), a grating lobe may occur. The horizontal distance between the receiving antennas is set to 0.5λ, and pieces of angle information extracted from channels of the receiving antennas are compared and compensated for, thereby minimizing the angle ambiguity of angle measurement caused by the grating lobe.

In addition, as shown in FIG. 3, since the two transmission antennas Tx1 and Tx2 are offset by the vertical offset ΔO in the vertical direction, a first reception signal transmitted from the transmission antenna Tx1 and received by the receiving antenna unit and a second reception signal transmitted from the transmission antenna Tx2 and received by the receiving antenna unit may have a phase difference according to a vertical offset ΔO.

In addition, a first transmission signal and a second transmission signal having orthogonality to each other may be simultaneously transmitted through the first transmission antenna TX1 and the second transmission antenna TX2.

Therefore, a target distance from the antenna unit 100 to a target may be determined using a time difference between a transmission time and a reception time. Also, horizontal information or vertical information (i.e., elevation angle) of the target may be determined using a phase difference between the first and second transmission signals and the first and second reception signals.

In the radar device according to the present embodiment, radar signals transmitted or received from the transmission antenna or receiving antenna with an offset in the horizontal direction may be modulated and utilized through different modulation methods.

Meanwhile, in the radar device according to the present embodiment, due to horizontal and vertical separation between transmission antennas which simultaneously transmits signals, a receiving end may have a receiving array structure in which multiple receiving antennas are actually present, and a same number of multiple virtual receiving antennas are also virtually present.

As described above, an antenna structure in which a plurality of virtual receiving antennas are further virtually present at the receiving end may be referred to as an "antenna structure having a virtual aperture structure."

For example, in an antenna structure of FIG. 3, during a specific detection period (i.e., frame), the first transmission signal and the second transmission signal having orthogonality to each other are simultaneously transmitted through the first transmission antenna Tx1 and the second transmission antenna Tx2, respectively.

Meanwhile, since the first transmission antenna Tx1 and the second transmission antenna Tx2, transmitting the first transmission signal and the second transmission signal, are spaced apart from each other by the horizontal distance dt in the horizontal direction and the offset distance ΔO in the vertical direction, the receiving antenna, receiving a reflected signal reflected from an object, experiences an effect equivalent to receiving reflected signals of the first and second transmission signals shifted by the horizontal distance dt in the horizontal direction and the offset distance ΔO in the vertical direction.

In this case, as a concept separate from an actual receiving antenna, a receiving antenna, virtually existing due to horizontal and vertical separation between transmission antennas simultaneously transmitting signals, may be referred to as a virtual receiving antenna.

In addition, a vector from a specific reference point to each virtual receiving antenna may be expressed as a virtual channel vector.

FIGS. 4A and 4B illustrate an arrangement structure of a transmission antenna and a receiving antenna included in an antenna unit 100 of a radar device according to an embodiment, and arrangement of a virtual receiving antenna according to the arrangement structure.

In FIGS. 4A and 4B, the transmission antenna is indicated by a circle and the receiving antenna by a rectangle. In addition, the actual antenna is indicated by a solid line, and the virtual receiving antenna is indicated by a dotted line.

In an embodiment of FIG. 4A, two transmission antennas Tx1 and Tx2 are disposed apart from each other by a horizontal distance 3dt in a horizontal direction and an offset distance DO in a vertical direction. In addition, four receiving antennas have the same vertical position as the transmission antenna Tx1 and are disposed apart from each other by a horizontal distance dr.

In this case, four virtual receiving antennas formed at a receiving end are formed to be offset from the four actual receiving antennas by the horizontal distance 3dt in the horizontal direction and the offset distance ΔO in the vertical direction.

In the embodiment of FIG. 4A, a radar device according to the present embodiment includes the plurality of transmission antennas and the plurality of receiving antennas. One of the plurality of transmission antennas is disposed apart from the other thereof by the offset distance ΔO in the vertical direction. In addition, different transmission signals having orthogonality are transmitted from the transmission antennas.

Accordingly, a composite signal of a reception signal and a transmission signal reflected from a target may be divided in the vertical direction, and thus vertical information of the target may be determined.

In addition, an aperture of the receiving antenna may be expanded by the plurality of virtual receiving antennas formed at a receiving side, thereby improving resolution.

A size of the aperture of the receiving antenna may be defined as a distance between the receiving antennas positioned at both ends of the receiving side in the horizontal direction.

According to an embodiment, in the case of FIG. 4A, assuming that a distance dt and a distance dr are the same, the size of the aperture of the receiving antenna may be extended to a distance 6dr in the horizontal direction.

Therefore, as shown in FIG. 4A, the detection resolution may be improved by using aperture expansion through the virtual receiving antenna.

Meanwhile, FIG. 4B illustrates an embodiment in which a receiving antenna is vertically offset.

In the embodiment of FIG. 4B, two transmission antennas Tx1 and Tx2 are spaced apart from each other by a horizontal distance 3dt in a horizontal direction and are not offset in a vertical direction. On the other hand, among four receiving antennas, one receiving antenna Rx4 is spaced apart from the other three receiving antennas Rx1 to Rx3 by an offset distance ΔO in the vertical direction.

That is, the three receiving antennas Rx1 to Rx3 are disposed at the same vertical position as the two transmission antennas, and only the receiving antenna Rx4 is disposed to be offset by the offset distance ΔO in the vertical direction. A distance between each of the four receiving antennas is a horizontal distance dr.

As shown at the right side of FIG. 4B, at a receiving side, a virtual receiving antenna array may be formed in a similar manner to that shown in FIG. 4A.

In FIGS. 3 and 4A, 4B, a virtual channel vector $\vec{a}(\phi)$ between Rv0 among virtual receiving antennas and Rv1 vertically spaced apart by Δ0 therefrom may be expressed by the Equation 3 below.

$$\vec{a}(\phi) = \begin{bmatrix} \vec{a}_0(\phi) \\ \vec{a}_1(\phi) \end{bmatrix} = \begin{bmatrix} 1 \\ \exp(j2\pi d\sin\phi) \end{bmatrix} \qquad \text{[Equation 3]}$$

Here, $\vec{a}_0(\phi)$ is a virtual channel vector of the virtual receiving antenna Rv0, $\vec{a}_1(\phi)$ is a virtual channel vector of the virtual receiving antenna Rv1, d is the vertical offset distance ΔO between Rv0 and Rv, and φ is the phase of the signal.

In conclusion, the transceiver 200 of the radar device according to the present embodiment may form (Nt–1)*Nr virtual receiving antennas or virtual channel vectors.

As shown in FIGS. 3 and 4A, 4B, in the radar device according to the present embodiment, the transmission antenna or the receiving antenna among the MIMO antennas may be offset in the vertical direction and different transmission signals (e.g., orthogonal signals) may be used. This enables acquisition of the azimuth information of the target as well as the vertical direction information such as an elevation angle or a height information.

Accordingly, by using the MIMO method, it is possible to increase the antenna aperture by creating a virtual receiving antenna. Consequently, this improves the angular resolution of the radar device.

In addition, if a MIMO method including a vertical offset antenna is used, it becomes possible to estimate the vertical information of a target, that is, an elevation angle, by virtually arranging antennas in a vertical direction.

Meanwhile, since the phase of the signal is used to estimate target information, there is a need to minimize the phase error.

In addition, since phase errors occur between reception signals corresponding to multiple transmission antennas up to the far-field distance of the radar device, the phase errors are required to be accurately measured and compensated for.

However, in the case of MIMO radar devices, the far-field distance may be significantly large, making it nearly impossible to measure phase errors in a conventional anechoic chamber.

Therefore, as in the present disclosure, the phase error between reception signals having phase linearity above a specific level or threshold, among the reception signals reflected from a specific moving target, may be measured for each distance. A lookup table for phase error compensation is then generated and utilized for phase error compensation.

Therefore, it is possible to acquire precise target information by compensating for the phase error for each distance in the MIMO radar device.

Figure 5:
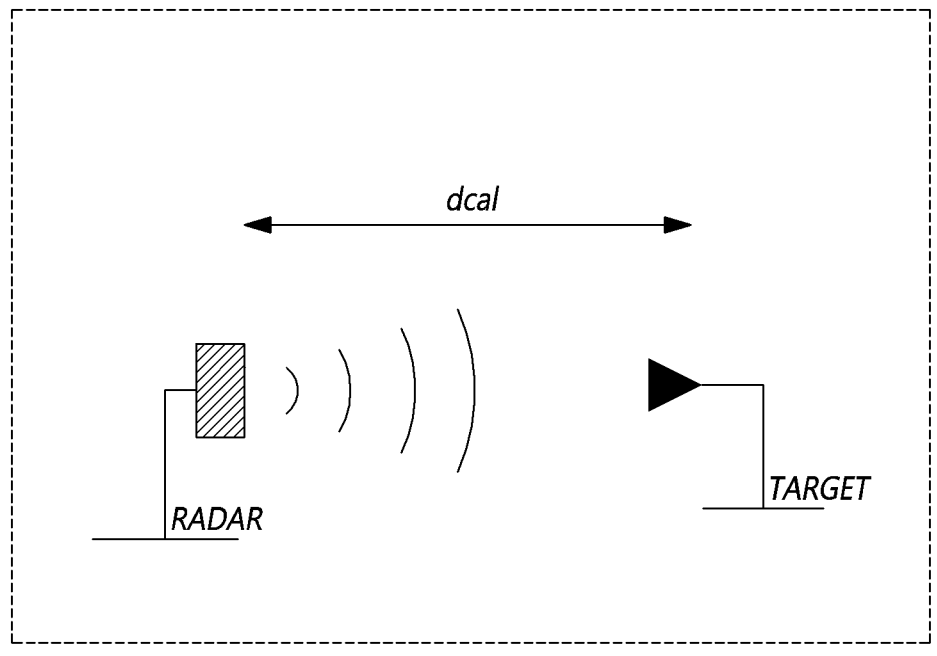
FIG. 5 illustrates a principle of measuring phase error for each distance according to an embodiment of the present disclosure.

FIG. 5 illustrates a principle of measuring phase error for each distance according to an embodiment of the present disclosure.

Referring to FIG. 5, a radar device, incorporating a phase error compensation device according to an embodiment of the present disclosure, is positioned at a specific location.

With this setting, the phase error may be measured for each distance by separating a reference target with a known exact location from the radar device at a specific distance.

In this case, the distance between the radar device and the reference target may be smaller than a far-field distance $d_{far}$ of the MIMO radar device.

In addition, a separation distance between the MIMO radar device for phase error measurement and the reference target may be expressed as a calibration distance $d_{cal}$.

In addition, the first phase error may refer to a phase difference between the first and second reception signals, which correspond to the first and second transmission signals respectively transmitted from the first transmission antenna Tx1 and the second transmission antenna Tx2 included in the MIMO radar device according to the embodiment. The first phase error may be acquired by the first determiner 310 based on a moving target according to the embodiment.

On the other hand, the second determiner 330 included in the phase error compensation device 300 according to the embodiment may acquire the phase difference φr,err according to the distance or range while changing a known exact location of a reference target from Om from the radar device to the far-field distance $d_{far}$ of the MIMO radar device in a condition of FIG. 5.

In this case, the acquired phase difference value may be a second phase error between a phase of the first reception signal corresponding to the first transmission signal transmitted from the first transmission antenna and a phase of the second reception signal corresponding to the second transmission signal from the second transmission antenna. The second phase error may be acquired by the second determiner 330 based on the reference target according to the embodiment.

In addition, the second determiner 330 may store the measured second phase error for each distance for utilizing as data for phase error compensation.

Since the second phase error obtained using the reference target is close to a fixed value for each radar device specification, the difference between samples of radar devices with the same specifications may be small.

Therefore, the accurate phase error compensation for a radar device with the specified specifications can be achieved by utilizing the second phase error through the second determiner 330.

Figure 6:
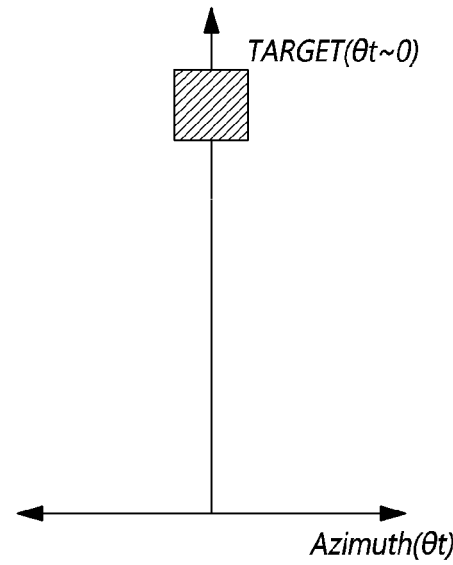
FIG. 6 illustrates a state in which a target for measuring phase error is placed in front of the radar device.
Figure 7:
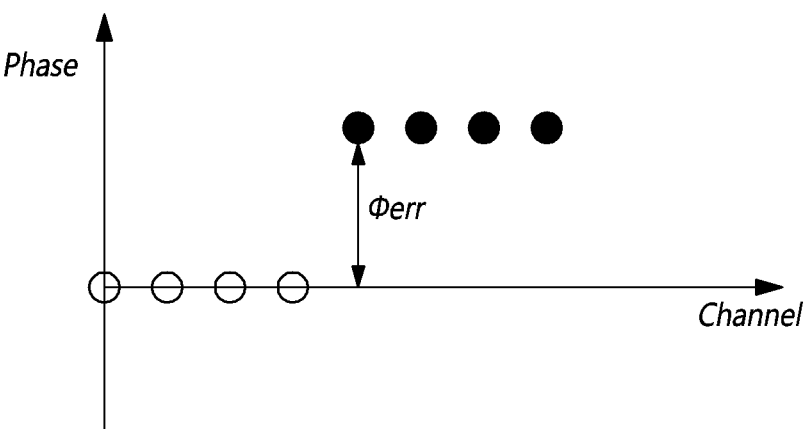
FIG. 7 illustrates a principle of occurring a phase error in first and second reception signals by a first transmission antenna (Tx1) and a second transmission antenna (Tx2) in that state.

FIG. 6 illustrates a state in which a target for measuring phase error is placed in front of the radar device, and FIG. 7 illustrates a principle of occurrence of a phase error in first and second reception signals by a first transmission antenna Tx1 and a second transmission antenna Tx2 in that state.

At a location within the far-field distance of the MIMO radar device, a phase difference occurs between reception signals from virtual receiving antennas that overlap horizontally. This phase difference may be referred to as a phase error $\phi_{err}$.

For the convenience of measurement, as shown in FIG. 6, it is assumed that a target for phase error measurement is a single target and is placed at an azimuth of 0 degrees, that is, in front of the radar device.

In addition, it is assumed that the antenna arrangement is as shown in FIG. 3, and the first reception signals of the four receiving channels (i.e., virtual channel vectors) corresponding to the first transmission antenna Tx1 have a phase of 0 degrees.

In this case, the second reception signals of the four receiving channels corresponding to the second transmission antenna Tx2 of the MIMO radar device may have a phase of $\phi_{err}$. In this case, $\phi_{err}$ may be expressed as a phase difference or phase error between the first and second reception signals.

Referring to FIGS. 6 and 7, since the azimuth of the target is 0 degrees, a phase term for the azimuth is 0, and only the phase difference $\phi_{err}$ due to the first and second transmission antennas Tx1 and Tx2 exists.

Specifically, a virtual channel vector $\vec{a}_{tx_1}(0)$ of the first reception signals (i.e., four reception channels) corresponding to the first transmission signal transmitted from the first transmission antenna Tx1, and a virtual channel vector $\vec{a}_{tx_2}(0)$ of the second reception signals corresponding to the second transmission signal transmitted from the second transmission antenna Tx2 may be determined by Equation 4 below.

$$\vec{a}_{tx_1}(0) = \begin{bmatrix} \exp(j\phi_0) \\ \exp(j(\phi_0)) \\ \vdots \\ \exp(j(\phi_0)) \end{bmatrix} \qquad \text{[Equation 4]}$$

$$\vec{a}_{tx_2}(0) = \begin{bmatrix} \exp(j(\phi_0 + \phi_{err})) \\ \exp(j(\phi_0 + \phi_{err})) \\ \vdots \\ \exp(j(\phi_0 + \phi_{err})) \end{bmatrix}.$$

That is, even if the first and second transmission signals have the same phase, the first reception signal and the second reception signal may have a specific phase difference $\phi_{err}$.

This phase difference $\phi_{err}$ may vary depending on the distance between the radar device and the target, and there is required to accurately measure and compensate the phase difference.

In this specification, the phase error depending on distance r may be expressed as $\phi$r,err.

Figure 8:
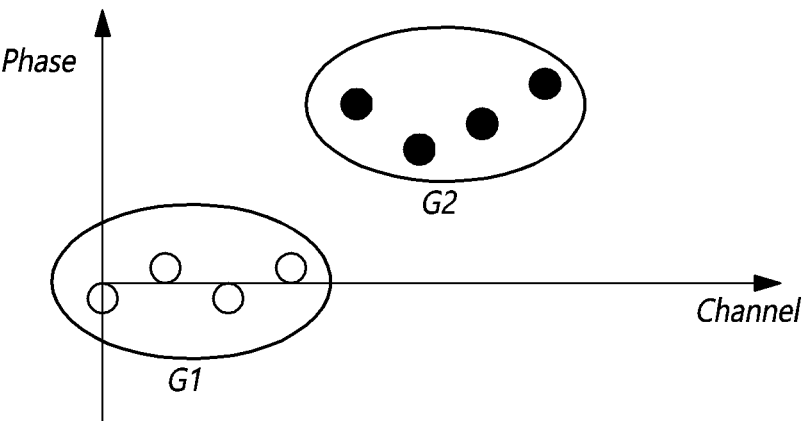
FIG. 8 is a diagram for explaining a method of selecting a moving target according to phase linearity in the phase error compensation device according to the embodiment.

FIG. 8 is a diagram for explaining a method of selecting a moving target according to phase linearity in the phase error compensation device according to the embodiment.

The first determiner 310 of the phase error compensation device 300 may determine, for each first distance to a moving target selected among the plurality of moving objects, a first phase error between a phase of a first reception signal corresponding to a first transmission signal transmitted from the first transmission antenna and a phase of a second reception signal corresponding to a second transmission signal from the second transmission antenna.

Specifically, the first determiner 310 may determine the first phase error by exclusively using the first or second reception signal whose phase linearity is greater than or equal to a specific threshold.

For this purpose, the first determiner 310 may collect phase information related to the moving object. In doing so, the first determiner 310 may assess the linearity across multiple reception signals corresponding to each transmission antenna Tx. It would then utilize only the data exhibiting a phase linearity surpassing a specific threshold for determining the phase error.

Referring to FIG. 8, among the groups of four reception signals corresponding to one transmission antenna, the reception signals of a first group G1 display an almost 0 phase indicating high linearity. On the other hand, the reception signals of a second group G2 exhibit a significant phase deviation indicating low linearity.

The linearity of reception signals may be characterized as the inverse of the average value of the phase difference of multiple reception signals within each group, but is not limited thereto.

In the case of FIG. 8, the linearity of the reception signals of the first group G1 may be greater than or equal to a specific threshold, whereas the linearity of the reception signals of the second group G2 may be less than or equal to a specific threshold.

In this case, the first determiner 310 of the phase error compensation device 300 according to the embodiment may exclude the reception signals of the second group G2 from the pool of candidate data considered for phase error determination.

Typically, a set of reception signals (i.e., virtual channel vectors) corresponding to a transmission signal transmitted from a specific transmission antenna exhibit nearly identical phase values, resulting in relatively high phase linearity.

Therefore, the reception signals exhibiting low linearity may be considered as distorted due to factors such as multiple propagation paths, making them less suitable unsuitable for use as data for phase error compensation in a MIMO radar device.

Accordingly, the phase error compensation device 300 in the present embodiment may achieve a more precise acquisition of a phase error compensation value by exclusively using data of a moving target with a phase linearity exceeding a specific threshold.

In this case, the first determiner 310 may compare the tracking object (i.e., the target) with other objects during the scan period to ascertain whether the tracking object is a moving object.

That is, the first determiner 310 may compare the position/velocity information of the target tracked during a specific scan period with the position/velocity information of other stationary objects (e.g., fixed structures around the road) detected during the scan period, thereby enabling selection of a moving target for determining phase error.

Figure 9:
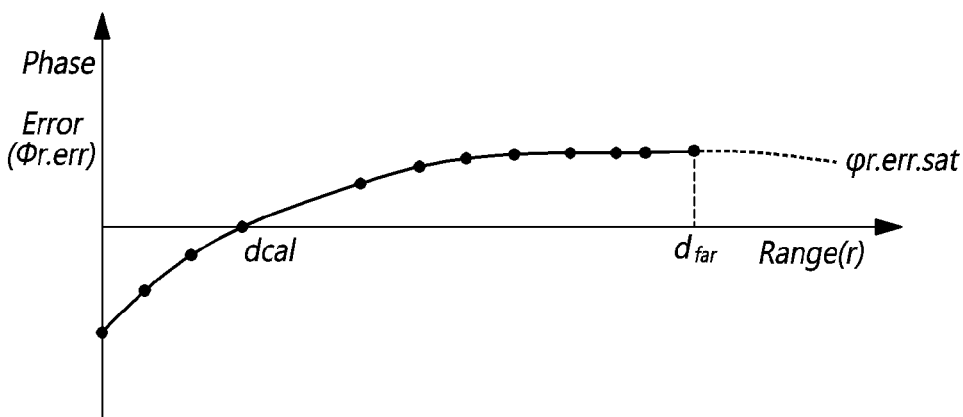
FIG. 9 illustrates an example of a range-phase error graph generated by the phase error compensation device according to the embodiment.

FIG. 9 illustrates an example of a range-phase error graph generated by the phase error compensation device 300 according to this embodiment.

The first determiner 310 of the phase error compensation device 300 according to the present embodiment may determine a first phase error $\phi_{r,err}$ for each first distance up to the far-field distance of the radar device.

According to an embodiment, i) the first determiner 310 may determine an average of the first phase error for each first distance as the first phase error for each first distance. Meanwhile, according to an embodiment, ii) the first determiner 310 may perform a curve fitting in a range-phase error graph on data collected for each first distance and determine the first phase error for each first distance based on a fitting line.

Specifically, i) the first determiner 310 may measure a plurality of first phase errors for each distance and calculate an average value of the plurality of first phase errors for each distance, thereby determining the first phase error $\phi_{r,err}$ for each first distance to the field distance.

Also, ii) the first determiner 310 may measure a plurality of first phase errors $\phi_{r,err}$ for each distance and perform curve fitting in a range-phase error graph based on the measured first phase errors.

The fitting line determined by curve fitting may be a function representing a phase error value for each distance.

The first phase error $\phi_{r,err}$ for each first distance up to the far-field distance of the MIMO radar may be determined by this fitting line.

FIG. 9 illustrates an example of the range-phase error graph and fitting line.

According to an embodiment, the fitting line in the range-phase error graph may have the minimum absolute phase error value at the SIMO-based far-field distance $d_{far\_SIMO}$ for the first or second transmission antenna.

That is, as shown in FIG. 9, a phase error may have a value close to 0 at the far-field distance $d_{far\_SIMO}$ of the SIMO radar including only one transmission antenna.

More specifically, the phase error may have a negative value at a distance smaller than the SIMO-based far-field distance $d_{far\_SIMO}$, and the phase error may have a positive value at a distance greater than the SIMO-based far-field distance $d_{far\_SIMO}$.

In addition, the fitting line in the range-phase error graph may have a constant saturation phase error value $\phi_{r,err,sat}$ at a distance greater than the far-field distance of the MIMO radar.

In the MIMO radar device, a phase error may occur for each distance of the reception signal due to multiple transmission antennas in a transition section up to the far-field distance $d_{far}$.

Since this phase error is an obstacle to accurate estimation of target information, there is required to compensate the phase error for each distance of a target.

Therefore, according to the present embodiment, the azimuth and elevation angles of the target may be precisely estimated by storing phase error information for each distance as shown in FIG. 9 as a lookup table and correcting the phase error when estimating target information.

Figure 10:
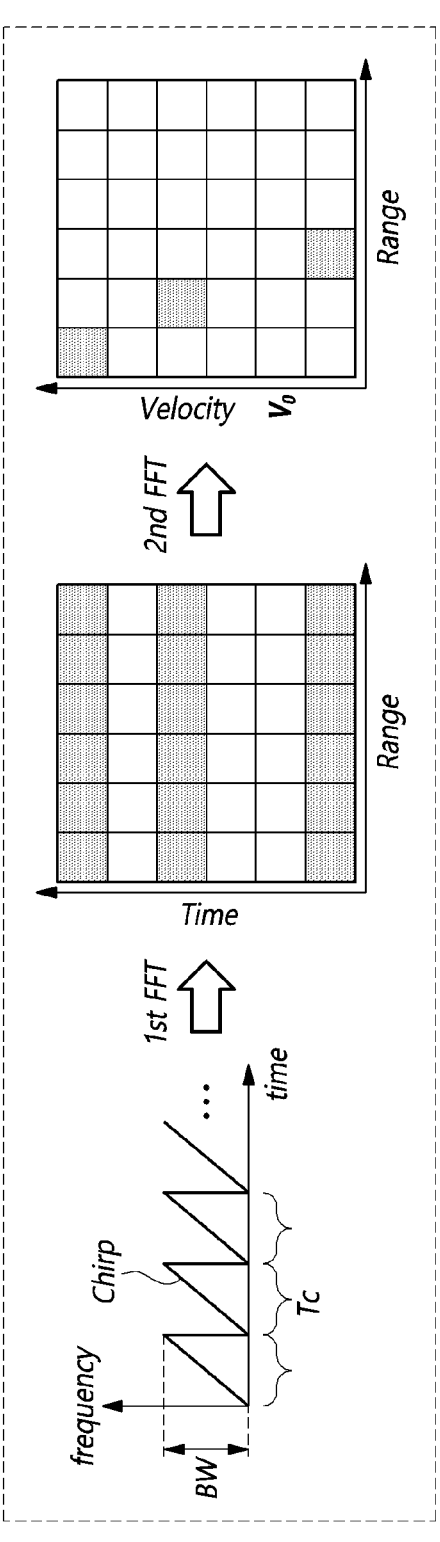
FIG. 10 illustrates the principle of acquiring range-velocity information of a target in the radar device according to the embodiment.

FIG. 10 illustrates the principle of acquiring range-velocity information of a target in the radar device according to this embodiment.

Referring to FIG. 10, the radar device according to the present embodiment may perform a first fourier transform (1st FFT) on the reception signal for a fast time to obtain a time component according to a distance. Subsequently, it performs a second fourier transform (2nd FFT) for a slow time, compressing a signal existing at each distance according to a velocity to calculate a range-velocity information of the target.

More specifically, the signal processor 400 of the radar device according to the embodiment, as shown on the left side of FIG. 10, may perform a first Fourier transform (1st FFT), specifically a fast Fourier transform, on a radar reception signal containing a fast ramp or a fast chirp. This calculation produces a range-time graph, representing a time component according to a range.

Next, the signal processor 400 may perform a second Fourier transform on a range-time component and calculate a range-velocity domain information, representing speed information according to the distance as shown in the right side of FIG. 10. This range-velocity domain information may also be referred to as a range-Doppler map.

For example, as shown in FIG. 10, if 2-D Fourier Transform (FFT) is performed on a composite signal of a reception signal and a transmission signal, three grid areas may be depicted as targets on the range-Doppler map. The distance and speed of the target may be estimated by using the information from the range-Doppler map.

In addition, the signal processor 400 of the radar device according to the embodiment may perform Fourier transform on the reception signal and identify a peak of the reception signal using CFAR (Constant False Alarm Rate) calculation or local Maximization method.

Next, the signal processor 400 may generate the virtual channel vectors for the reception signals, compensate for the phase error for each distance as determined according to the embodiment, and estimate the azimuth angle and elevation angle information of the target.

Figure 11:
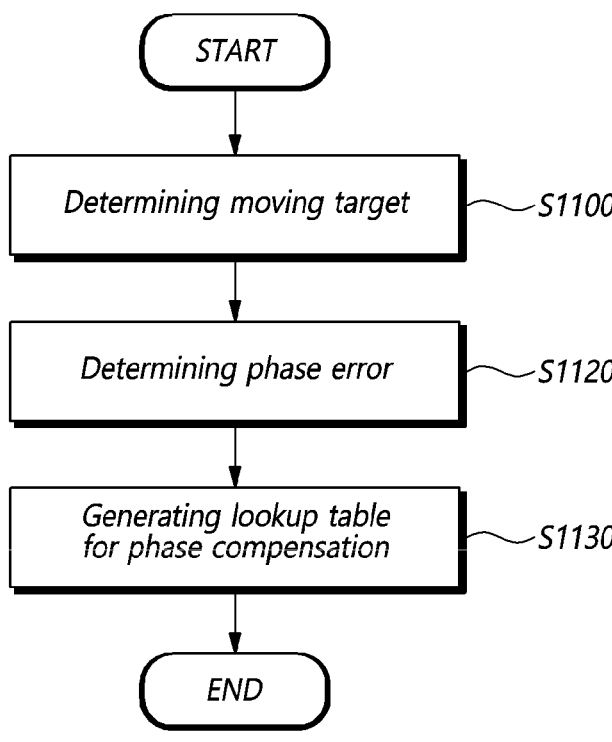
FIG. 11 is a flowchart of the phase error compensation method according to the embodiment.

FIG. 11 is a flowchart of the phase error compensation method according to the embodiment.

The phase error compensation method according to the embodiment may include a moving object determination step S1110, a phase error determination step S1120, and a lookup table generation step S1130.

In the moving object determination step S1110, a moving target may be identified by receiving a reception signal from each of a plurality of receiving antennas. In this case, the moving target may be determined by comparing the tracked object during a specific scan period with another object during the corresponding scan period.

In the phase error determination step S1120, the radar device may determine, for each first distance to the moving target, a first phase error, which is a phase difference between a phase of the first reception signal corresponding to the first transmission signal transmitted from the first transmission antenna and a phase of second reception signal corresponding to the second transmission signal transmitted from the second transmission antenna.

According to an embodiment, the first phase error may be determined using only the first or second reception signals whose phase linearity is greater than a specific threshold. That is, a reception signals having a linearity lower than a specific threshold may be excluded from candidate data for determining the first phase error.

In addition, in the phase error determination step S1120, there may be determined the first phase error for each first distance up to the far-field distance $d_{far}$ of the MIMO type radar.

In addition, in the phase error determination step S1120, the first phase error may be determined for each first distance up to the far-field distance of the MIMO radar based on the SIMO-based calibration distance $d_{cal}$ for the first or second transmission antenna.

In addition, the phase error determination step S1120 may be performed by averaging phase error for each first distance. Alternatively, the phase error determination step S1120 may be performed by performing a curve fitting in a range-phase error graph for the data collected for each first distance and determining the first phase error for each first distance based on a fitting line.

In the latter case, the fitting line in the range-phase error graph may have the minimum absolute phase error value in the SIMO-based far-field distance $d_{far\_SIMO}$ for the first or second transmission antenna.

In addition, the fitting line in the range-phase error graph may exhibit a saturated phase error value at a distance greater than the far-field distance of the MIMO radar.

In the lookup table generation step S1130, a lookup table for phase error compensation, including phase error compensation values for each distance, may be generated based on the first phase error for each first distance determined in step S1120.

Figure 12:
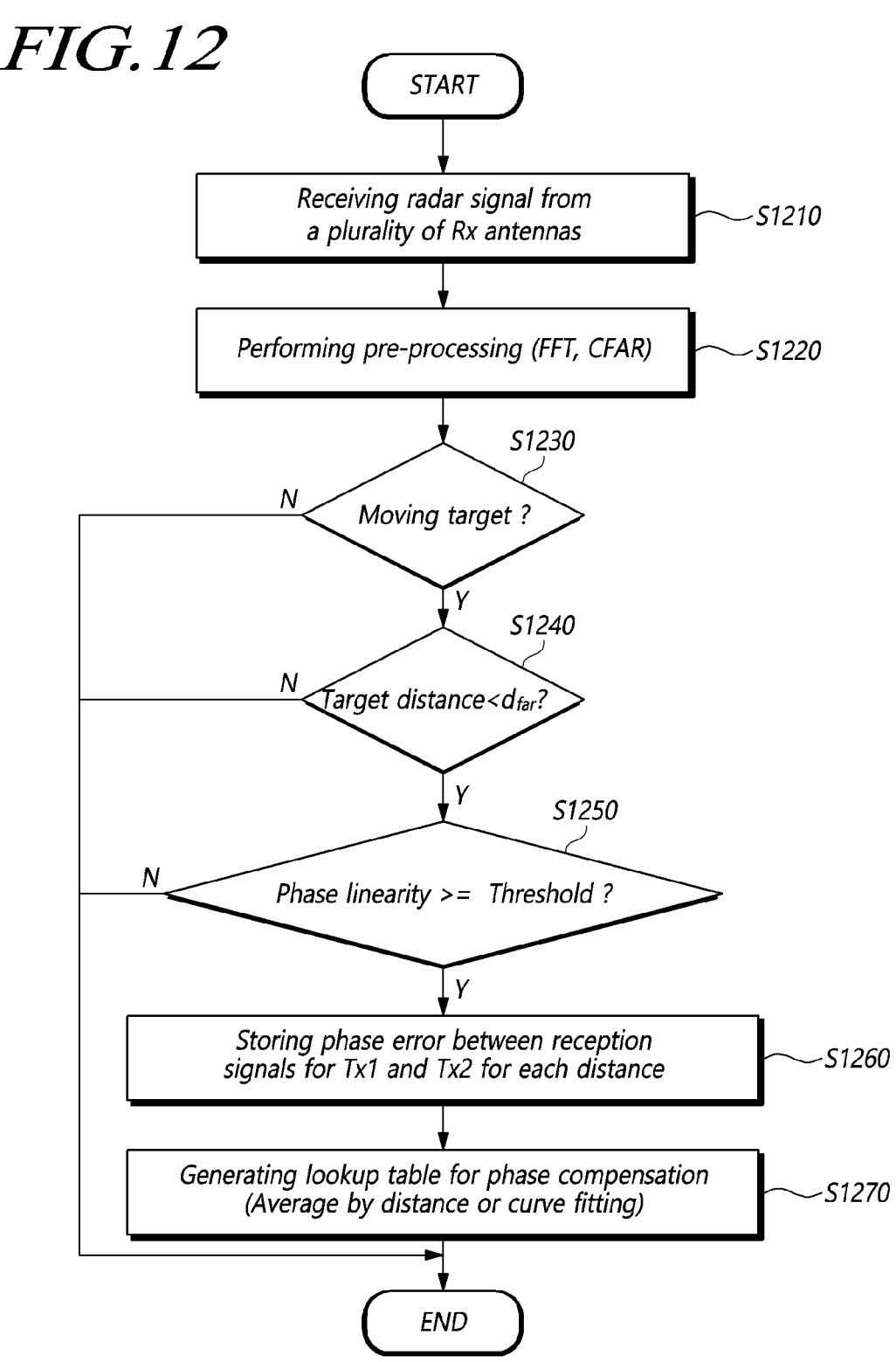
FIG. 12 is a detailed flowchart of the phase error compensation method according to the embodiment.

FIG. 12 is a detailed flowchart of the phase error compensation method according to the embodiment.

In step S1210, the phase error compensation device according to the embodiment may receive radar signals by a plurality of receiving antennas Rx.

The reception signal in this case may include a first reception signal and a second reception signal corresponding to a first transmission signal and a second transmission signal transmitted from two or more transmission antennas included in the MIMO radar device.

There may be a phase error between the first and second reception signals, and this phase error may change depending on the distance from the radar device.

Next, in the step S1220, the phase error compensation device may extract the distance and speed components of the target by preprocessing the reception signal.

The preprocessing may include, but is not limited to, performing two Fourier transforms and CFAR calculation on the reception signal.

In the step S1230, the phase error compensation device may determine whether the detected target is a moving target.

To this end, the phase error compensation device may compare the tracked object during a specific scan period with other objects during the same scan period.

If the detected target is determined to be a moving target, in step S1240, the phase compensation device may determine whether the distance r of the moving target is smaller than the far-field distance $d_{far}$ of the MIMO radar device.

If the distance r of the moving target is determined to be smaller than the far-field distance $d_{far}$ of the radar device, in step S1250, the phase error compensation device may determine whether the phase linearity of the reception signals corresponding to the specific transmission signals is above a threshold (S1250).

In step S1260, the phase error compensation device may select reception signals whose phase linearity is greater than or equal to a specific threshold and store a phase difference between the first and second reception signals corresponding to the first transmission antennas Tx1 and the second transmission antenna Tx2 among the selected reception signals, organized by distance.

The phase difference value for each distance may be a phase error value or a phase error compensation value for each distance.

Next, in step S1270, the phase error compensation device may generate a lookup table in which phase error compensation values for each distance are matched.

In this case, the first phase error for each distance may be calculated by averaging the phase errors by distance, or by performing curve fitting on a range-phase error graph for data collected by first distance and determining the first phase error based on the fitting line.

Thereafter, the phase compensation device may compensate for the phase error of the reception signal based on the phase error compensation value stored in the lookup table.

Figure 13:
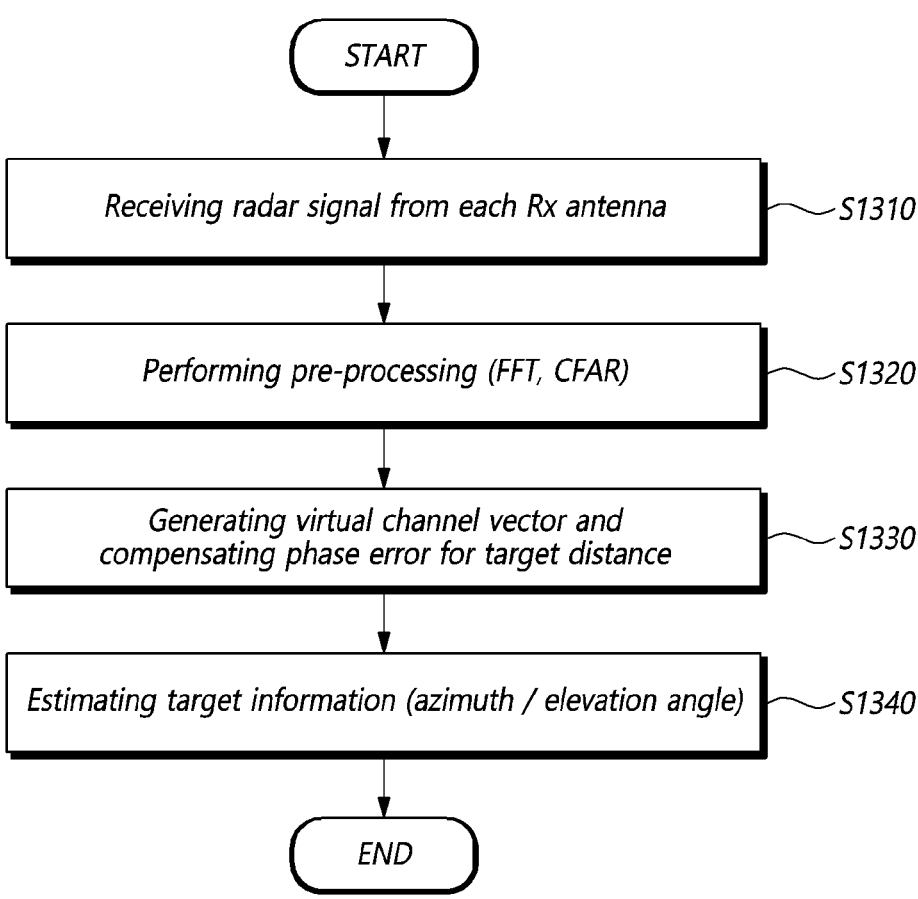
FIG. 13 is a flowchart explaining a process in which the radar device according to the embodiment acquires target information with phase error corrected using a phase error compensation device.

FIG. 13 is a flowchart explaining a process in which the radar device according to the embodiment acquires target information with correcting phase error corrected by utilizing a phase error compensation device.

In step S1310, a MIMO radar device according to the embodiment may receive radar reception signals from a plurality of receiving antennas Rx.

The reception signal may include a first reception signal and a second reception signal corresponding to a first and second transmission signals transmitted from two or more transmission antennas included in the MIMO radar device. There may be a phase error between the first and second reception signals, and this phase error may change depending on the distance from the radar device.

In step S1320, the radar device may generate a range-Doppler map of the target by performing preprocessing (FFT and CFAR) on the reception signal, and extract the distance/velocity components of the target based on the range-Doppler map.

Next, in step S1340, the radar device may generate virtual channel vectors for a plurality of reception signals and compensate for the phase error for each distance in each virtual channel vector. Specifically, the radar device may compensate for the phase error for each target distance based on the information stored in the lookup table for phase compensation generated according to the embodiment.

Then, in step S1340, the radar device may estimate the azimuth angle information and/or elevation angle information of the target based on data in which the phase error for each distance has been compensated.

Figure 14A:
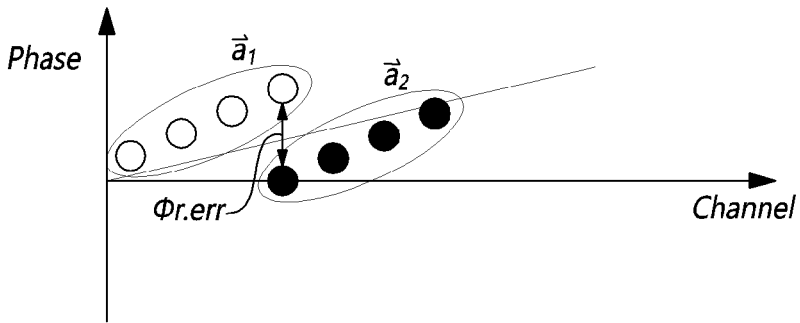
FIGS. 14A and 14B illustrate an example of acquisition of target information depending on whether or not phase error compensation is applied according to the embodiment.
Figure 14B:
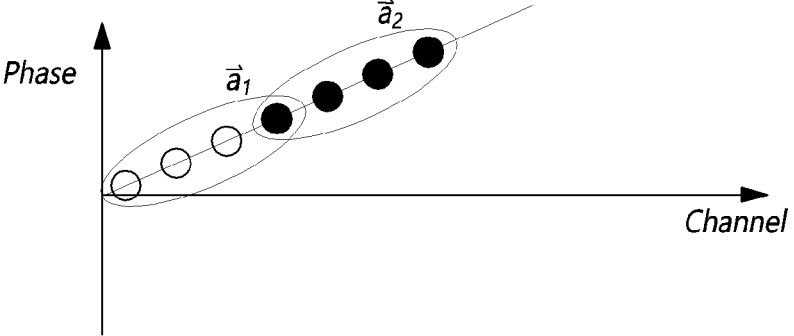

FIGS. 14A and 14B illustrate an example of acquisition of target information depending on whether or not phase error compensation is applied, according to the embodiment.

FIG. 14A illustrates a case in which phase error compensation is not applied, and FIG. 14B illustrates a case in which phase error compensation according to the embodiment is applied.

As shown in FIG. 14A, in the case that the phase error compensation for each distance according to the embodiment is not applied, there is a phase error $\phi_{r,err}$ between a first virtual channel vector $\vec{a}_1$, of the first reception signals by the first transmission signal and the second virtual channel vector $\vec{a}_2$ of the second reception signal by the second transmission signal.

Therefore, when estimating the azimuth and elevation angles of the target using the first and second virtual channel vectors, errors may occur in the azimuth and elevation angles of the target, as shown in the solid line in FIG. 14A.

On the other hand, as shown in FIG. 14B, in the case that the phase error compensation for each distance according to the embodiment is applied, the phase error may be removed between the first virtual channel vector $\vec{a}_1$ and the second virtual channel vector $\vec{a}_2$.

Accordingly, as shown in FIG. 14B, the first and second virtual channel vectors have a constant linearity, and thus, the azimuth and elevation angles of the target can be accurately estimated.

Figure 15:
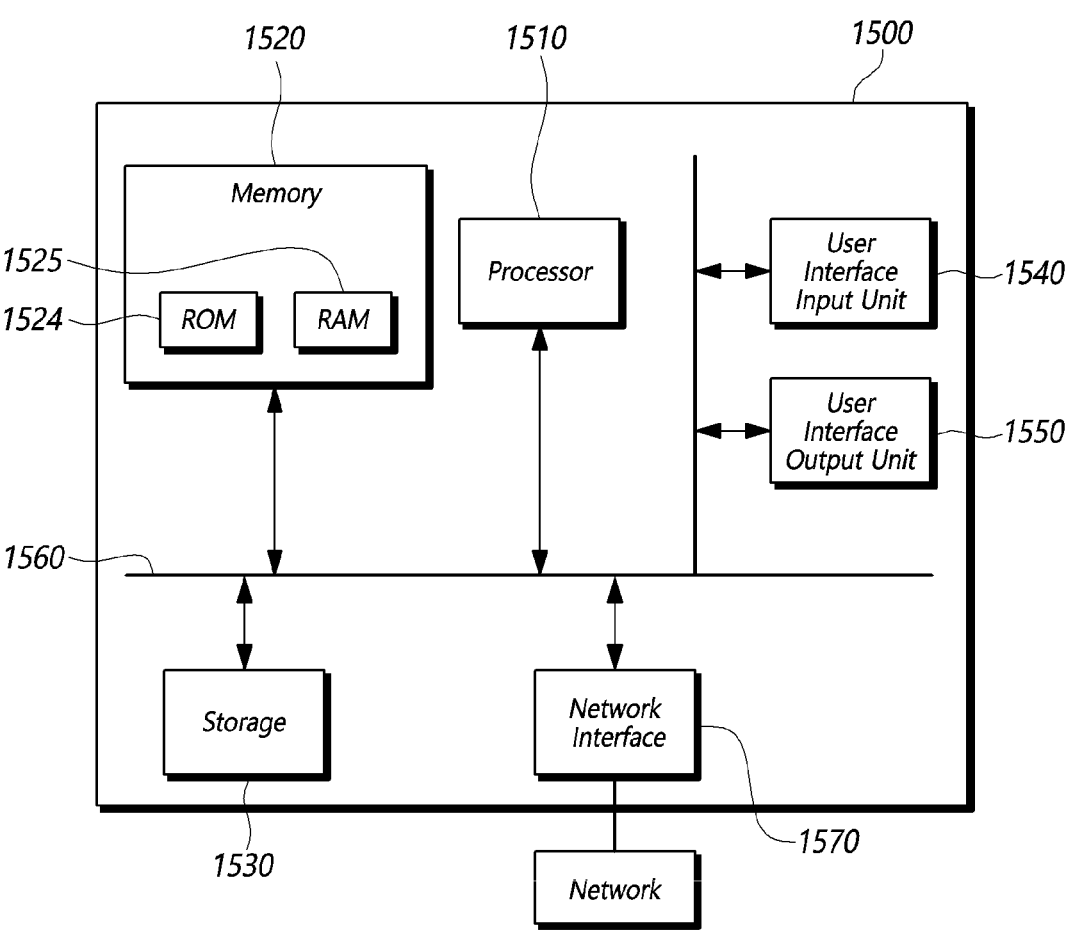
FIG. 15 illustrates an example of a hardware configuration of a radar device or a phase error compensation device included therein according to an embodiment of the present disclosure.

FIG. 15 illustrates an example of a hardware configuration of a radar device or a phase error compensation device included therein according to an embodiment of the present disclosure.

Referring to FIG. 15, the radar device and the phase error compensation device included therein according to the above-described embodiments may be implemented with hardware or software implemented in a computer system.

That is, the transceiver 200, the phase error compensation device 300 and the signal processor 400 of the above-described radar device may be implemented as a computer device having hardware as shown in FIG. 15.

As shown in FIG. 15, a computer system 1500, which is an implementation form of the radar device according to the present embodiment or the transceiver 200, the phase error compensation device 300 and the signal processor 400 included therein, may include one or more elements of one or more processors 1510, a memory 1520, a storage 1530, a user interface input unit 1540, and a user interface output unit 1550, and the elements may communicate with each other through a bus 1560.

In addition, the computer system 1500 may also include a network interface 1570 for connecting to a network. The processor 1510 may be a central processing unit (CPU) or a semiconductor device or an integrated circuit that executes processing instructions stored in the memory 1520 and/or the storage 1530. The memory 1520 and the storage 1530 may include various types of volatile/nonvolatile storage media. For example, the memory may include a read-only memory (ROM) 1524 and a random access memory (RAM) 1525.

In addition, a software module performing a function of the first determiner 310 and the lookup table generator 320 constituting the phase error compensation device according to the embodiment may be installed in the computer system 1500 used in the present embodiment. Also, the first determiner 310, the lookup table generator 320, and the second determiner 330 may be implemented in hardware described herein or in software, or in combination thereof.

Specifically, in the computer system 1500, there may be installed a software module for measuring phase error for each distance using a moving target with phase linearity above a specific threshold or reference target, and software module for generating and storing a lookup table including the acquired phase error information for each distance, and a software module for processing reception data to compensate for phase error for each distance.

The processor (i.e., Main Control Unit; MCU) 1510 of the radar device according to the present embodiment may execute the above-described software module stored in the storage 1530 or the memory 1520 to perform a corresponding function.

As described above, according to the radar device of the present embodiments, it is possible to accurately measure the phase error for each distance up to the far-field distance of the MIMO radar device.

In addition, it is possible to improve the accuracy of target information estimation of the radar device by compensating for the phase error for each distance.

It should be noted that although all or some of the configurations or elements included in one or more of the embodiments described above have been combined to constitute a single configuration or component or operated in combination, the present disclosure is not necessarily limited thereto. That is, within the scope of the object or spirit of the present disclosure, all or some of the configurations or elements included in the one or more of the embodiments may be combined to constitute one or more configurations or components or operated in such combined configuration (s) or component(s). Further, each of the configurations or elements included in one or more of the embodiments may be implemented by an independent hardware configuration; however, some or all of the configurations or elements may be selectively combined and implemented by one or more computer program(s) having one or more program module (s) that perform some or all functions from one or more combined hardware configuration(s). Codes or code segments constituting the computer program(s) may be easily produced by those skilled in the art. As the computer programs stored in computer-readable media are read and executed by a computer, embodiments of the present disclosure can be implemented. The media for storing computer programs may include, for example, a magnetic storing medium, an optical recording medium, and a carrier wave medium.

Further, unless otherwise specified herein, terms 'include', 'comprise', 'constitute', 'have', and the like described herein mean that one or more other configurations or elements may be further included in a corresponding configuration or element. Unless otherwise defined herein, all the terms used herein including technical and scientific terms have the same meaning as those understood by those skilled in the art. The terms generally used such as those defined in dictionaries should be construed as being the same as the meanings in the context of the related art and should not be construed as being ideal or excessively formal meanings, unless otherwise defined herein.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A phase error compensation device of a radar, including a first and a second transmission antennas and a plurality of reception antennas, comprising:

a first determiner configured to determine, for each first distance from among a plurality of first distances between the radar and a moving target, a first phase error between a phase of a first reception signal and a phase of a second reception signal, wherein the plurality of first distances are defined as distances from the radar to the moving target as the moving target moves relative to the radar, the first and second reception signals are received by the plurality of reception antennas, and the first reception signal corresponds to a first transmission signal transmitted from the first transmission antenna and the second reception signal corresponds to a second transmission signal from the second transmission antenna; and a lookup table generator configured to generate and store, based on the first phase error for the each first distance, a lookup table for compensating a phase of a target reception signal, the lookup table including phase compensation values corresponding to the each first distance.

2. The phase error compensation device of claim 1, further comprising a second determiner configured to determine, for each second distance from among a plurality of second distances between the radar and stationary reference targets, a second phase error between a phase of a first reference reception signal and a phase of a second reference reception signal, wherein the plurality of second distances are defined as distances from the radar to the stationary reference targets as the stationary reference targets are located in different locations relative to the radar, wherein the first reference reception signal corresponds to a first reference transmission signal transmitted from the first transmission antenna and the second reference reception signal corresponds to a second reference transmission signal transmitted from the second transmission antenna, wherein the lookup table generator configured to generate the lookup table based on the second phase error for the each second distance.

3. The phase error compensation device of claim 2, wherein when, for the each first distance, a plurality of first reception signals and a plurality of second reception signals corresponding to the plurality of first distances are received, the first determiner is configured to exclude signals from among the plurality of first reception signals and signals from among the plurality of second reception signals whose phase linearity is smaller than a predetermined threshold, in determining the first phase error.

4. The phase error compensation device of claim 3, further comprising a storage unit for storing the first phase error for the each first distance and the second phase error for the each second distance.

5. The phase error compensation device of claim 1, wherein the first determiner is configured to determine the first phase error for the each first distance up to a far-field distance of the radar.

6. The phase error compensation device of claim 5, wherein the first determiner is configured to determine the first phase error for the each first distance up to the far-field distance of the radar of a multi-input multi-output (MIMO) type based on a single-input multi-output (SIMO) calibration distance for the first transmission antenna or the second transmission antenna.

7. The phase error compensation device of claim 5, wherein the first determiner is configured to determine, for the each first distance, a plurality of first phase errors based on a plurality of first reception signals and a plurality of second reception signals corresponding to the plurality of first distances, calculate an average value of the plurality of first phase errors, and set the average value of the plurality of first phase errors as the first phase error for the each first distance.

8. The phase error compensation device of claim 5, wherein the first determiner is configured to performs a curve fitting in a range-phase error graph over the plurality of first distances, and determine the first phase error for the each first distance based on a fitting line.

9. The phase error compensation device of claim 8, wherein the fitting line in the range-phase error graph has a minimum absolute phase error value at a single-input multi-output (SIMO) based far-field distance ($d_{far\_SIMO}$) for the first transmission antenna or the second transmission antenna.

10. The phase error compensation device of claim 8, wherein the fitting line in the range-phase error graph has a saturated phase error value at a distance greater than the far-field distance of the radar of a multi-input multi-output (MIMO) type.

11. A phase error compensation method of a radar, including a first and a second transmission antennas and a plurality of reception antennas, comprising:

determining, for each first distance from among a plurality of first distances between the radar and a moving target, a first phase error between a phase of a first reception signal and a phase of a second reception signal, wherein the plurality of first distances are defined as distances from the radar to the moving target as the moving target moves relative to the radar, the first and second reception signals are received by the plurality of reception antennas, and the first reception signal corresponds to a first transmission signal transmitted from the first transmission antenna and the second reception signal corresponding to a second transmission signal transmitted from the second transmission antenna; and generating and storing, based on the first phase error for the each first distance, a lookup table for compensating a phase of a target reception signal, the lookup table including phase compensation values corresponding to the each first distance.

12. The phase error compensation method of claim 11, wherein when, for the each first distance, a plurality of first reception signals and a plurality of second reception signals corresponding to the plurality of first distances are received, determining the first phase error comprises excluding signals from among the plurality of first reception signals and signals from among the plurality of second reception signals whose phase linearity is smaller than a predetermined threshold, in determining the first phase error.

13. The phase error compensation method of claim 11, wherein determining the first phase error comprises determining the first phase error for the each first distance up to a far-field distance of the radar of a multi-input multi-output (MIMO) type.

14. The phase error compensation method of claim 13, wherein determining the first phase error comprises determining the first phase error for the each first distance up to a far-field distance of the radar of the MIMO type based on a single-input multi-output (SIMO) calibration distance for the first transmission antenna or the second transmission antenna.

15. The phase error compensation method of claim 13, wherein determining the first phase error comprises performing a curve fitting in a range-phase error graph over the plurality of first distances, and determining the first phase error for the each first distance based on a fitting line.

16. The phase error compensation method of claim 15, wherein the fitting line in the range-phase error graph has a minimum absolute phase error value at a single-input multi-output (SIMO) based far-field distance ($d_{far\_SIMO}$) for the first transmission antenna or the second transmission antenna.

17. The phase error compensation method of claim 15, wherein the fitting line in the range-phase error graph has a saturated phase error value at a distance greater than the far-field distance of the radar of the MIMO type.

18. A radar device comprising:

an antenna unit including a transmission antenna unit with a first transmission antenna and a second transmission antenna, and a receiving antenna unit with a plurality of receiving antennas;

a transceiver configured to control to transmit a transmission signal through the transmission antenna unit and receive a reception signal through the receiving antenna unit;

a phase error compensation device configured to determine, for each first distance from among a plurality of first distances between the radar and a moving target, a first phase error between a phase of a first reception signal and a phase of a second reception signal, wherein the plurality of first distances are defined as distances from the radar to the moving target as the moving target moves relative to the radar, the first reception signal corresponds to a first transmission signal transmitted from the first transmission antenna and the second reception signal corresponds to a second transmission signal transmitted from the second transmission antenna, and wherein the phase error compensation device is further configured to generate and store, based on the first phase error for the each first distance, a lookup table for compensating a phase of a target reception signal, the lookup table including phase compensation values corresponding to the each first distance; and a signal processor configured to acquire target information by compensating the phase of the target reception signal based on the phase compensation values for the each first distance stored in the lookup table.

19. The radar device of claim 18, wherein when, for the each first distance, a plurality of first reception signals and a plurality of second reception signals corresponding to the plurality of first distances are received, the phase error compensation device is configured to exclude signals from among the plurality of first reception signals and signals from among the plurality of second reception signals whose phase linearity is smaller than a specific threshold, in determining the first phase error.

20. The radar device of claim 19, wherein the phase error compensation device is configured to determines the first phase error for the each first distance up to a far-field distance of the radar of a multi-input multi-output (MIMO) type.

21. The radar device of claim 20, wherein the phase error compensation device is configured to perform a curve fitting in a range-phase error graph over the plurality of first distances, and determine the first phase error for the each first distance based on a fitting line.

22. The radar device of claim 18, wherein the first transmission antenna and the second transmission antenna are arranged to be offset a predetermined distance in a vertical direction, and information on the moving target includes information on the vertical direction of the moving target.

23. The radar device of claim 18, wherein one receiving antenna from among the plurality of receiving antennas is arranged to be offset a predetermined distance in a vertical direction from remaining receiving antennas, and the information on the moving target includes information on the vertical direction of the moving target.

* * * * *